United States Patent [19]

Haag et al.

[11] Patent Number: 5,555,338
[45] Date of Patent: Sep. 10, 1996

[54] SELF-SUPPORTING ELECTRICAL AND OPTICAL OVERHEAD CABLE

[75] Inventors: Helmut Haag, Titz; Georg Hog, Monchen-Gladbach, both of Germany

[73] Assignee: Alcatel Kabel AG & Co., Hanover, Germany

[21] Appl. No.: 483,544

[22] Filed: Jun. 7, 1995

[30] Foreign Application Priority Data

Jul. 19, 1994 [DE] Germany .................. 44 25 464.4

[51] Int. Cl.⁶ .................................................. G02B 6/44
[52] U.S. Cl. .......................... 385/101; 385/100; 385/103; 385/106; 174/40 R
[58] Field of Search .......................... 385/100, 101–114; 174/40 R, 41, 78

[56] References Cited

U.S. PATENT DOCUMENTS 5,082,379  1/1992  Lindner et al. .................. 385/101

OTHER PUBLICATIONS etz vol. 112 (1991) Book 10, pp. 482–483 No Month.

Primary Examiner—John D. Lee
Assistant Examiner—Phan T. H. Palmer
Attorney, Agent, or Firm—Ware, Fressola, Van Der Sluys & Adolphson

[57] ABSTRACT

An electrical overhead cable includes: cabled electrical conductors (3); tensile strength support elements (1, 2); and optical waveguide elements made of metal coated tubes (4) containing optical fibers (9). The metal coating on the optical fiber-containing tubes is a thin, self-enclosed metal layer (5), which is in direct contact with the surface of the tube (4).

20 Claims, 2 Drawing Sheets

SELF-SUPPORTING ELECTRICAL AND OPTICAL OVERHEAD CABLE

BACKGROUND OF THE INVENTION

1. Field of the Invention

The present invention concerns a self-supporting electrical overhead cable which includes cabled electrical conductors, tensile strength support elements, and optical waveguide elements made of metal coated tubes containing optical fibers.

2. Description of the Prior Art

Self-supporting electrical overhead cables including optical waveguides have been known for a long time. One known configuration example (which is described for example in the publication ETZ, Vol. 112 (1991) Book 10, page 482 and 483) is an overhead optical waveguide cable for overhead power lines. This known cable contains a special steel bundle core for overhead cables that is equipped with corrosion protection. Corrosion protection is necessary in the cable because the danger of contact corrosion exists with contact between special austenitic steel and the aluminum, Aldrey, Stalum or zinc-coated steel wires which make up the cable. The danger of corrosion is particularly high in the presence of a watery electrolyte containing chloride and oxygen, and/or f an electrical potential exists between the various cable elements.

As a defensive measure against corrosion, the known overhead cable provides the steel bundle core with an aluminum coating. The aluminum coating is formed by two aluminum bands or strips of 0.1 mm thickness each. The aluminum bands are cemented or otherwise adhesively attached lengthwise along the band edges of the aluminum bands. In this case, it is important to provide an equal electrical potential in the steel bundle core and in the armor wires that form the cable.

It has been found that these measures used in the above-described known cable do not provide secure protection against corrosion because the band edges of the aluminum bands cannot be tightly sealed. Additionally, the cemented aluminum bands can be damaged when they are stranded with the electrical conductors and the tensile strength metal elements which make up the cable. It has also been found that the wall thickness of the aluminum bands adds considerably to the outside diameter of the steel bundle core, and may cause a reduction in the number of optical waveguides contained within the cable.

SUMMARY OF THE INVENTION

Objects of the invention include the provision of a conductor cable or overhead cable having secure corrosion protection for tubes containing optical fibers, tensile strength elements and electrical conductors which constitute the conductor cable or the overhead cable.

Another object of the invention is to provide such a cable wherein optical fiber-containing tubes are diffusion-proof to thereby ensure the functional reliability of the optical fiber or fibers in the cable configuration.

It has been found that the foregoing objects can be readily attained by coating each optical fiber-containing tube within a cable with a thin-walled self-enclosed metal coating, which is in direct contact with the surface of the optical fiber-containing tube. By comparison with the prior art, such a metal coating in direct contact with the surface of the optical fiber-containing tube leads to a reduction in the outside diameter of the cable. Additionally, in the case of metal optical fiber-containing tubes, the self-enclosed metal coating provides secure protection against corrosion. Differences in the potential between the surface of the optical fiber-containing tube and the surrounding conductor strands or tensile strength elements are avoided.

In the event that the optical fibers are located inside plastic optical fiber-containing tubes, for example glass fiber reinforced plastic tubes, the thin, closed metal coating of the invention provides secure diffusion protection. Additionally, a tube according to the invention, which contains optical fibers, can be stranded without problems with the other elements of the cable configuration because the self-enclosed surface of the metal coating provides no points of attack for outside forces which exist during the manufacturing process.

It has been found that the metal coating of the invention, which is in direct contact with the surface of the optical fiber-containing tube being coated, limits the increase in cable diameter if, in accordance with a further development of the invention, the wall thickness of the metal coating is 5 to 70 μm, and preferably 15 to 40 μm.

If metal optical fiber-containing tubes are used, special advantages result from the fact that the metal coating can be metallurgically bonded to the surface of the metal tube. Such a bond is permanent, it provides a permanent corrosion protection to the inside of the stranded configuration of an overhead cable or a stranded conductor, and it also provides easier handling of the optical fiber-containing tube during the manufacturing process.

The self-enclosed, thin walled metal coating according to the invention can be applied to the surface of the optical fiber-containing tube in any desired manner. Thus, it has proven to be advantageous if the metal coating is a lengthwise welded thin walled metal band which is pulled down over the surface of the metal optical fiber-containing tube and is metallurgically bonded to it. Such a plating process ensures that the optical fiber-containing tubes, which are corrosion protected in this manner, can be wound on or off a spool without problems and be integrated into the stranded configuration of the overhead cable or phase cable.

If the respective applications require a particularly thin walled homogenous coating, a further development of the invention allows the metal coating to contain a sintered homogenous application of metal particles.

It has been found to be particularly advantageous if the metal coating is made of a homogenous material which is applied chemically or electrochemically. The metallurgical bond with the optical fiber-containing tube surface is ensured, the coating is homogeneously applied, and such a metal coating is diffusion-proof. A majority of overhead cables in the market today comprise a steel tube containing optical fibers in conjunction with aluminum-plated tensile strength steel wires and/or electrical conductors made of aluminum. In this case, the advantageous metal application is a layer of aluminum or an aluminum alloy, which is metallurgically bonded to the surface of the steel tube and is applied with a sintering process. Alternatively, the coating may be applied chemically or electrochemically, for example electrolytically.

The foregoing, and other objects, features and advantages of the present invention will become more apparent in light of the following detailed description of the exemplary embodiments thereof, as illustrated in the accompanying drawings.

DETAILED DESCRIPTION OF INVENTION

Figure 1:
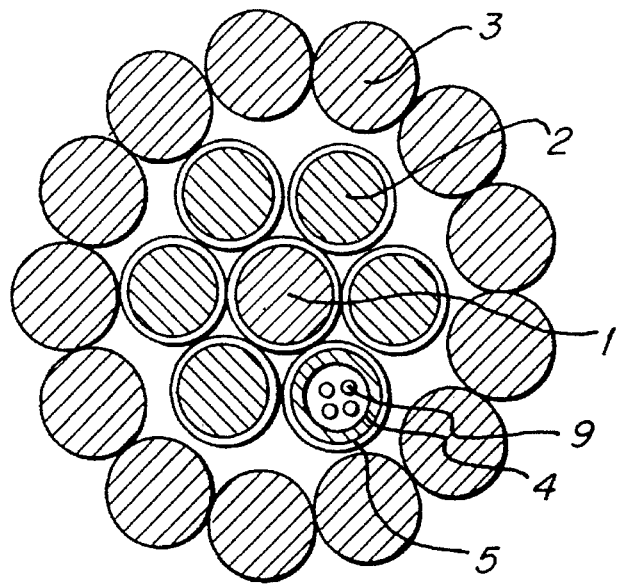
FIG. 1 is a cross-sectional view of a cable in accordance with the present invention.

Referring to FIG. 1, a cross-sectional view of an overhead cable is illustrated which has, for example, an outside diameter of about 12 mm, and which contains an inner supporting core (core wire) 1 in the form of an aluminum-sheathed steel wire. Twisted around the core wire 1 is a first layer of aluminum-plated steel wires 2. A second layer of wires above the first layer of aluminum-plated steel wires 2 includes power conducting aluminum or aluminum-alloy wires 3.

The first layer of wires immediately above the core wire 1 comprises at least one metal tube 4, preferably made of special steel, and having a diameter which corresponds to the diameter of the adjacent aluminum-plated steel wires 2. The metal tube 4 is filled, for example with a thixotropic gel, in which optical fibers 9 are imbedded lengthwise. Preferably, the optical fibers 9 have a defined excess length with respect to the metal tube 4.

The metal tube 4 is coated with a self-enclosed, thin walled metal coating 5 of the invention, which in the present case is made of aluminum or an aluminum alloy, to prevent corrosion from appearing inside the stranded configuration. The metal coating 5 is preferably applied electrolytically in a thickness of 10 to 20 µm, tightly surrounds the metal tube 4 with a smooth homogeneous surface, and therefore offers no points of attack for the mechanical forces that are present during the manufacture of the overhead cable.

Figure 2:
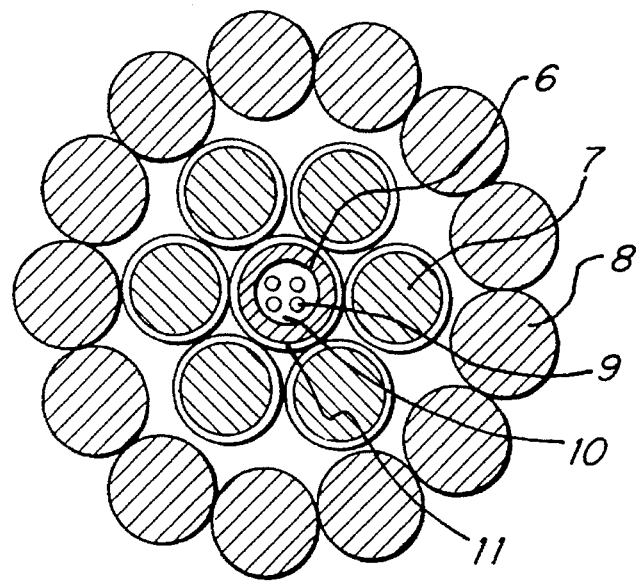
FIG. 2 is a cross-sectional view of a second embodiment of a cable in accordance with the present invention.

Referring now to FIG. 2, a self-supporting overhead cable is illustrated in which an armor layer of aluminum-plated steel wires 7 is twisted around a central steel tube 6. A second layer of conductor elements 8, preferably made of aluminum or a suitable aluminum alloy, surround the armor layer of aluminum-plated steel wires 7. Optical fibers 9 are arranged inside the steel tube 6. The optical fibers have at least a six per thousand excess length with respect to the length of the steel tube 6. The space 10 inside of the steel tube may be filled with a thixotropic gel, with a petroleum jelly basis for example.

In accordance with the invention, the steel tube 6 has a thin walled metal coating 11, of aluminum or an aluminum alloy in the present case because of the materials of the other elements of the stranded configuration example. The wall thickness of this metal coating 11 is for example 30 µm, it is produced for example by forming an aluminum band around the steel tube, which is then welded lengthwise and pulled over the tube in several operating stages. However, the metal coating 11 can also be produced by applying the aluminum material in the form of a powder, which is preferably applied under a protective gas to prevent oxidation. The applied layer is subsequently subjected to a sintering process.

Another method for forming the metal coating, as described with respect to FIG. 1, is an electrolytic application, done for example under a protective gas, to produce a diffusion-proof, homogenous aluminum coating 11 on the steel tube 6.

Figure 3:
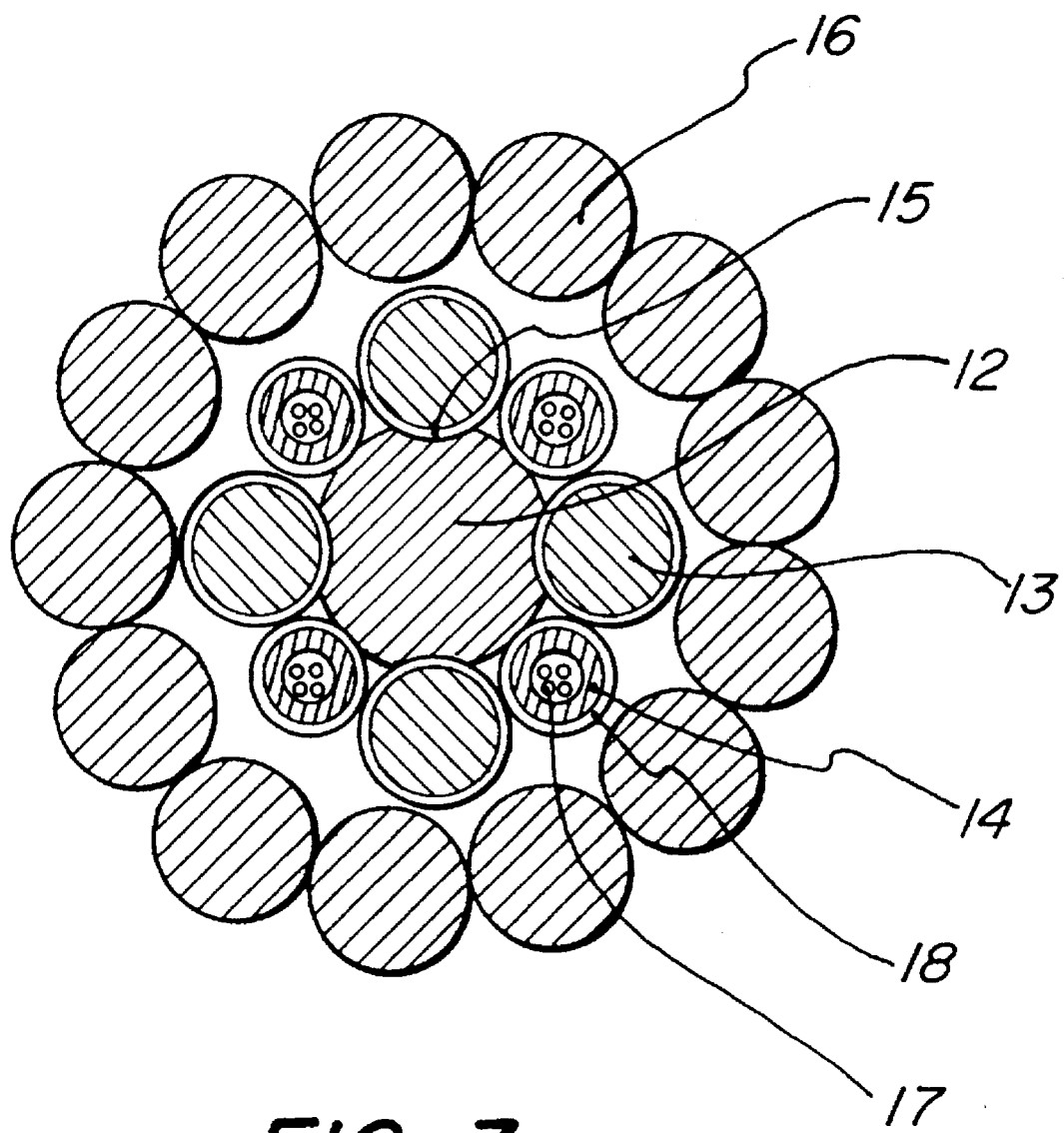
FIG. 3 is a cross-sectional view of a third embodiment of a cable in accordance with the present invention.

Another configuration of the invention is shown in FIG. 3. This configuration includes an inner core profile 12, for example in the form of a metal wire, made perhaps of steel or aluminum or steel in plated form. A first layer of aluminum-sheathed steel wires 13 (placed as armor wires), and steel tubes 14 (to receive the optical fibers) is placed over the inner core profile 12. As shown in FIG. 3, each of the steel tubes 14 is located between two armor wires 13-and each steel tube 14 has a smaller diameter than the adjacent armor wires 13. The armor wires 13 are fixed in their position by insertion into lengthwise grooves 15 formed in the inner core profile 12, so that the steel tubes 14 are protected when the cable is bent or subjected to other mechanical loads, for example in the form of vibrations during operation. A second layer which includes aluminum wires 16 (which serve to supply power) surrounds the first layer of armor wires 13 and steel tubes 14.

Optical fibers 17 are located inside the steel tubes 14. An excess length in the cable configuration is given by the selected twisting pitch of the various cable elements, and if necessary the optical fibers 17 are also provided with excess length in the steel tubes 14. The steel tubes may be made of special steel. The steel tubes 14 have a thin, closed homogenous metal coating 18, of 40 µm for instance. This metal coating 18 can be provided in accordance with the already mentioned manufacturing process examples described herein above with respect to FIGS. 1 and 2.

The invention is described herein as including steel tubes which are used for the optical fibers in the configuration, aluminum wires for the electrical conductors and aluminum-plated steel wires for the tensile strength elements. However, it may be desirable to deviate from these materials which are used as a rule today, and use other conductive metals in the cable configuration, for example copper or copper alloys. When such a copper or copper alloy is used, the protective metal coatings for the optical fiber-containing tubes must be made of a corresponding material, namely also of copper or a copper alloy, to avoid a difference in the electrical potential.

Additionally, it will be understood by those skilled in the art that the invention is of course not limited to the use of metal optical fiber-containing tubes. Plastic tubes, preferably reinforced with fiber glass, can be used to form the optical fiber-containing tubes if desired. Even if the protection of the cable configuration against corrosion is less important when plastic optical fiber-containing tubes are used, it may be necessary to make the plastic tubes diffusion-proof. This is achieved with the invention because the surface of the plastic tube is coated with a layer of a thin closed homogenous metal. Even if no metallurgical bond with the plastic tube material is possible in this case, in contrast to the known state of the art, the invention provides the secure protection against the introduction of moisture and other contamination into the optical fiber-containing tube.

Independently of the configurations described and illustrated herein, the present invention is applicable in all cases where metal tubes serve to receive optical fibers in such self-supporting overhead cables, where the appearance of corrosion can be expected because of differences in the electrical potential due to the materials being used for the metal tubes or for the other component elements.

Although the invention has been described and illustrated with respect to exemplary embodiments thereof, the foregoing and various other changes, omissions and additions may be made therein and thereto without departing from the spirit and scope of the present invention.

What is claimed is:

1. An overhead cable comprising:
 a plurality of cable elements including:
  (a) at least one electrical conductor;
  (b) at least one tensile strength support element; and
  (c) at least one optical fiber-containing tube containing at least one optical fiber; and
 a thin, self-enclosed metal coating which is in direct contact with the surface of said at least one optical fiber-containing tube, said metal coating including a layer of aluminum having a thickness between 5–70 µm.

2. An overhead cable as claimed in claim 1 wherein the thickness of said metal coating is preferably between 15–40 µm.

3. An overhead cable as claimed in claim 1 wherein said at least one optical fiber-containing tube is a metal tube and wherein said metal coating is metallurgically bonded to a surface of said metal tube.

4. An overhead cable as claimed in claim 3, wherein said metal coating comprises an electrochemically applied homogenous coating.

5. An overhead cable as claimed in claim 3 wherein said metal coating comprises a thin, lengthwise welded metal band, which is pulled over the surface of said metal tube and is metallurgically bonded thereto.

6. An overhead cable as claimed in claim 3, wherein said metal coating comprises a sintered homogenous application of metallic particles.

7. An overhead cable as claimed in claim 3, wherein said metal coating comprises a chemically applied homogenous coating.

8. An overhead cable as claimed in claim 1, wherein said at least one optical fiber-containing tube is a steel tube, said at least one tensile strength member is an aluminum-plated tensile strength steel wire, said at least one conductor is an aluminum conductor, and wherein said layer of aluminum is a layer of aluminum alloy which is metallurgically bonded to the surface of said steel tube.

9. An overhead cable as claimed in claim 1, wherein said at least one optical fiber-containing tube is a steel tube, said at least one tensile strength member is an aluminum-plated tensile strength steel wire, said at least one conductor is an aluminum conductor, and when said metal coating is metallurgically bonded to the surface of said steel tube.

10. An overhead cable as claimed in claim 1, wherein said at least one optical fiber-containing tube is a plastic tube.

11. An overhead cable as claimed in claim 10, wherein said plastic tube is a glass fiber reinforced plastic tube.

12. An overhead cable comprising:
 a plurality of cable elements including:
  (a) at least one electrical conductor;
  (b) at least one tensile strength support element; and
  (c) at least one metal optical fiber-containing tube containing at least one optical fiber; and
 a thin, self-enclosed metal coating which is metallurgically bonded to the surface of said at least one optical fiber-containing tube.

13. An overhead cable as claimed in claim 12, wherein the thickness of said metal coating is between 5–70 µm.

14. An overhead cable as claimed in claim 12 wherein the thickness of said metal coating is preferably between 15–40 µm.

15. An overhead cable as claimed in claim 12, wherein said metal coating comprises a thin, lengthwise welded metal band, which is pulled over the surface of said metal tube and is metallurgically bonded thereto.

16. An overhead cable as claimed in claim 12, wherein said metal coating comprises a sintered homogenous application of metallic particles.

17. An overhead cable as claimed in claim 12, wherein said metal coating comprises a chemically applied homogenous coating.

18. An overhead cable as claimed in claim 12, wherein said metal coating comprises an electrochemically applied homogenous coating.

19. An overhead cable as claimed in claim 12, wherein said at least one optical fiber-containing tube is a steel tube, said at least one tensile strength member is an aluminum-plated tensile strength steel wire, said at least one conductor is an aluminum conductor, and wherein said metal coating is a layer of aluminum which is metallurgically bonded to the surface of said steel tube.

20. An overhead cable as claimed in claim 12, wherein said at least one optical fiber-containing tube is a steel tube, said at least one tensile strength member is an aluminum-plated tensile strength steel wire, said at least one conductor is an aluminum conductor, and wherein said metal coating is a layer of aluminum alloy which is metallurgically bonded to the surface of said steel tube.

* * * * *

UNITED STATES PATENT AND TRADEMARK OFFICE
CERTIFICATE OF CORRECTION

PATENT NO. : 5,555,338
DATED : Sep. 10, 1996
INVENTOR(S) : Helmut Haag
Georg Hog It is certified that error appears in the above-indentified patent and that said Letters Patent is hereby corrected as shown below:

Column 5, line 5 (claim 1), "support clement"

should read --support element--

On the title page, item [73] Assignee: "Alcatel Kabel AG & Co.,

Hanover, Germany" should read --Alcatel Kabel AG & Co.,

Hannover, Germany--

Signed and Sealed this

Third Day of December, 1996

*Attest:*

BRUCE LEHMAN

*Attesting Officer*  *Commissioner of Patents and Trademarks*